United States Patent
Choi et al.

(10) Patent No.: US 9,256,749 B2
(45) Date of Patent: Feb. 9, 2016

(54) METHOD FOR INVOKING APPLICATION IN SCREEN LOCK ENVIRONMENT

(71) Applicant: Korea Advanced Institute of Science and Technology, Daejeon (KR)

(72) Inventors: Jun Kyun Choi, Daejeon (KR); Hyo Jin Park, Daejeon (KR); Jin Hong Yang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 14 days.

(21) Appl. No.: 14/340,199

(22) Filed: Jul. 24, 2014

(65) Prior Publication Data
US 2015/0033361 A1 Jan. 29, 2015

(30) Foreign Application Priority Data
Jul. 24, 2013 (KR) ........................ 10-2013-0087446

(51) Int. Cl.
| | |
|---|---|
| G06F 21/60 | (2013.01) |
| G06F 3/0481 | (2013.01) |
| G06F 3/0482 | (2013.01) |
| H04M 1/67 | (2006.01) |
| G06F 3/0488 | (2013.01) |
| H04M 1/725 | (2006.01) |
| G06F 21/31 | (2013.01) |
| G06F 21/74 | (2013.01) |
| G06F 21/36 | (2013.01) |

(52) U.S. Cl.
CPC .............. *G06F 21/60* (2013.01); *G06F 3/0482* (2013.01); *G06F 3/04817* (2013.01); *G06F 3/04883* (2013.01); *G06F 21/31* (2013.01); *G06F 21/316* (2013.01); *G06F 21/74* (2013.01); *H04M 1/67* (2013.01); *H04M 1/72563* (2013.01); *G06F 21/36* (2013.01); *G06F 2221/2105* (2013.01); *G06F 2221/2147* (2013.01)

(58) Field of Classification Search
CPC ......... G06F 21/31; G06F 21/36; G06F 21/60; G06F 21/74; G06F 21/316; G06F 3/04817; G06F 3/0482; G06F 3/04883; G06F 2221/2105; G06F 2221/2147; H04M 1/67; H04M 1/72563
See application file for complete search history.

(56) References Cited

U.S. PATENT DOCUMENTS

| | | | | |
|---|---|---|---|---|
| 8,872,796 B2 * | 10/2014 | Yoo | ....................... | G06F 3/0488 345/173 |
| 2014/0033298 A1 * | 1/2014 | Park et al. | ............... | G06F 21/32 726/17 |

OTHER PUBLICATIONS

Howtogeek. "Everything you need to know about customizing android lock screen." Howtogeek.com. Jun. 19, 2013. Accessed on Sep. 21, 2015. http://www.howtogeek.com/165507/everything-you-need-to-know-about-customizing-androids-lock-screen/.*

* cited by examiner

*Primary Examiner* — Jung Kim
*Assistant Examiner* — Ngoc D Nguyen
(74) *Attorney, Agent, or Firm* — Marshall, Gerstein & Borun LLP

(57) ABSTRACT

A method for invoking an application in a Screen Lock screen is disclosed herein. The method for invoking an application in a user equipment includes the steps of selecting at least one unlock application that is to be displayed on a Screen Lock screen among multiple applications, and displaying an unlock application icon respective to each of the select at least one unlock application on the Screen Lock screen.

19 Claims, 9 Drawing Sheets

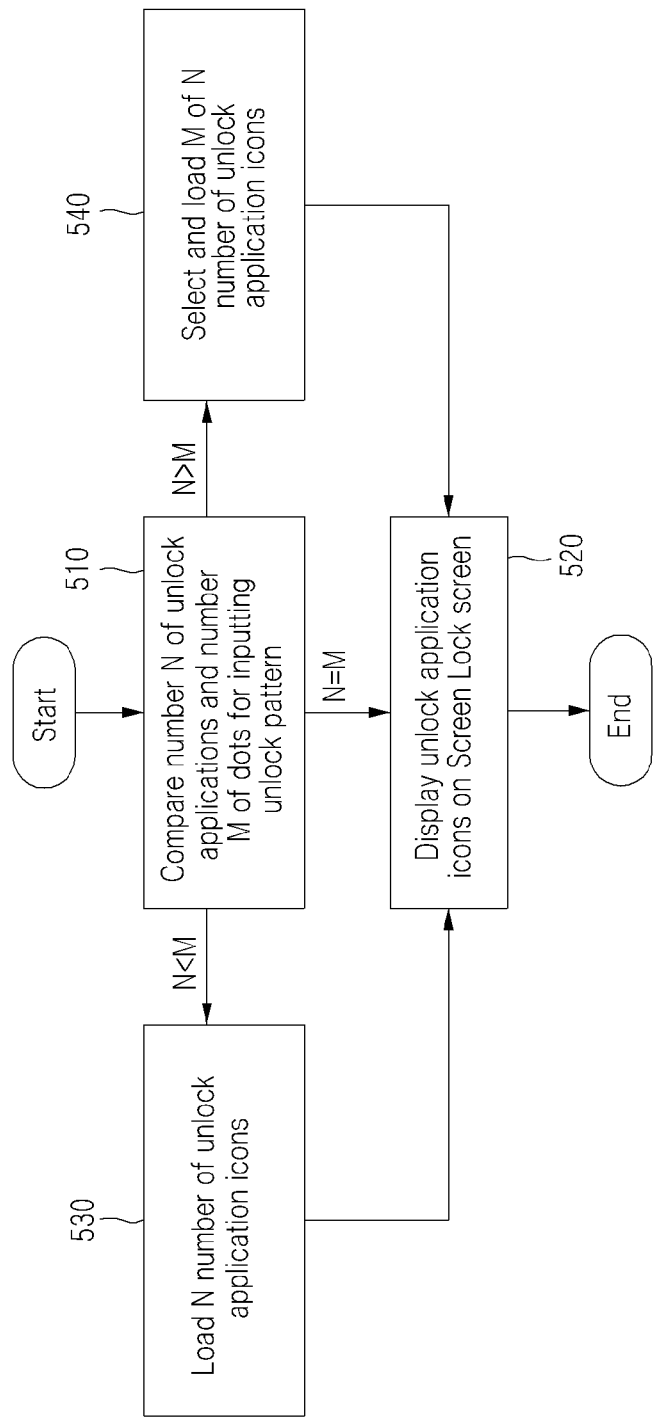

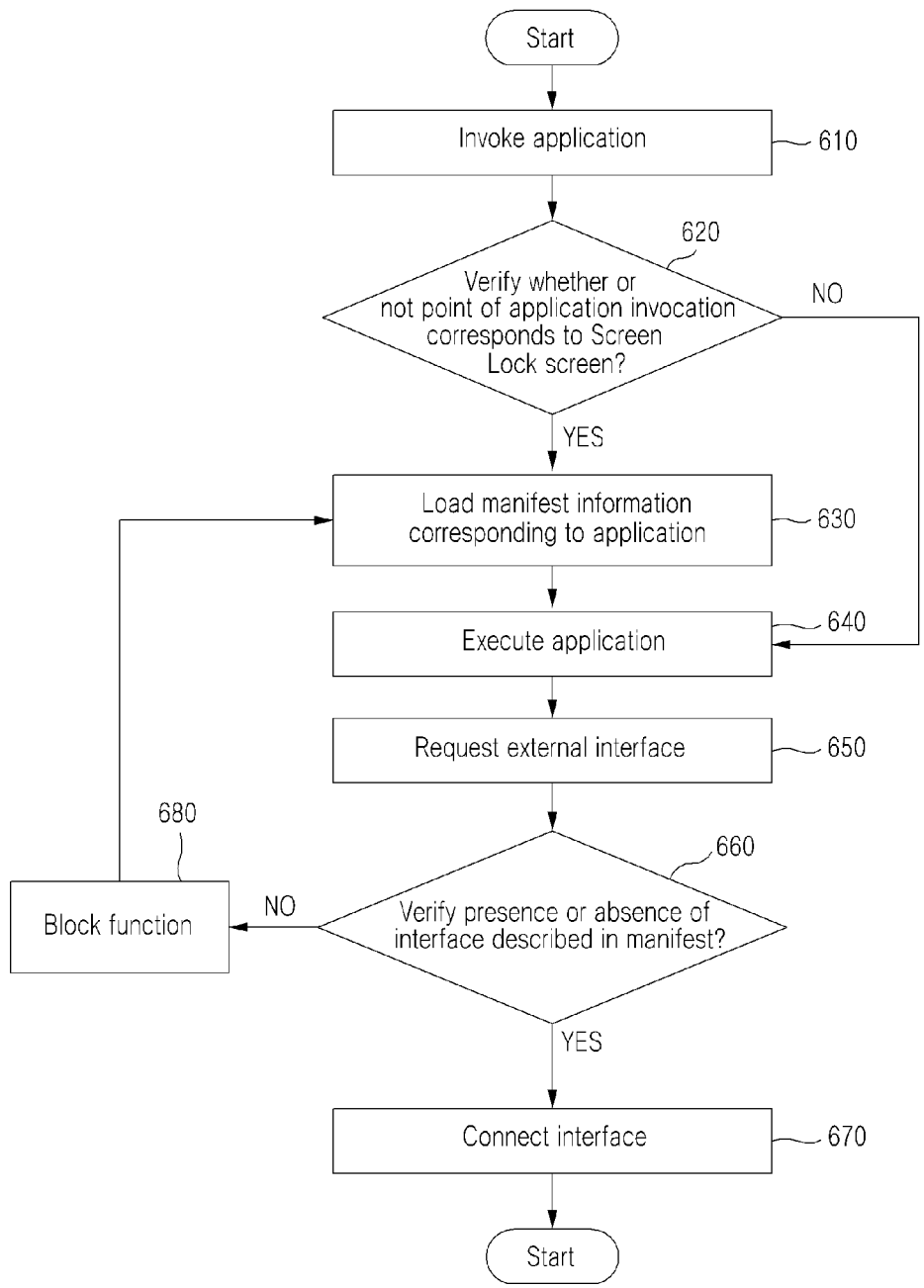

METHOD FOR INVOKING APPLICATION IN SCREEN LOCK ENVIRONMENT

This application claims the benefit of the Korean Patent Application No. 10-2013-0087446, filed on Jul. 24, 2013, which is hereby incorporated by reference as if fully set forth herein.

BACKGROUND OF THE INVENTION

1. Field of the Invention

The present invention relates to a method for invoking a specific application that is designated by a user and a method for resolving problematic issues regarding security and remote (or long distance) device control respective such invocation.

2. Discussion of the Related Art

With the expansion in the IoT/WoT environment, and as a variety of electronic devices can be controlled based upon mobile applications, users are installing and using a wider range of device controlling applications in their mobile user equipment environments. However, when the user seeks to use individual application, the user is required to run (or execute) the corresponding application each time. And, during this process, multiple user manipulation (or user operation) may be required. For example, when providing a related art card-type application list, it is inconvenient in that a specific application is required to be invoked after flipping a series of cards until a wanted card is reached. Additionally, when the user has locked an initial screen, since the user is required to unlock the initial screen and then run the wanted application, a larger number of user manipulations may be required. In order to resolve such problems, a method for directly invoking a specific application, which is designated by the user, from a Screen Lock screen may be provided. And, by doing so, it is intended to provide a function enabling the user to invoke a specific application more easily and conveniently. Additionally, a method for resolving issues of security and remote device control, which may be problematic in this case, and a solution for limiting functions at application levels will also be proposed herein.

SUMMARY OF THE INVENTION

Accordingly, the present invention is directed to a method for invoking applications in a Screen Lock environment that substantially obviates one or more problems due to limitations and disadvantages of the related art.

An object of the present invention is to provide a method for directly invoking a specific application designated by the user from a Screen Lock screen, so as to enable the user to invoke a specific application more easily and conveniently.

However, when the function of an application can be controlled at a remote location, problems may occur due to unwanted device operation caused by unintended situations, such as misplacing (or losing) the mobile user equipment. Accordingly, another object of the present invention is to provide a method for resolving issues of security and remote device control and a solution for limiting functions at application levels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, as a method for invoking an application in a user equipment, the method for invoking an application includes the steps of selecting at least one unlock application that is to be displayed on a Screen Lock screen among multiple applications, and displaying an unlock application icon respective to each of the select at least one unlock application on the Screen Lock screen.

Additionally, the method may further include the steps of receiving an additional input related to an unlock application icon that is to be added to the Screen Lock screen from a user, and adding the unlock application icon that is to be added to the Screen Lock screen in accordance with the additional input.

The step of receiving an additional input related to an unlock application icon that is to be added to the Screen Lock screen from a user may include the steps of providing a list of applications being installed in the user equipment to the user, and receiving an input related to an unlock application that is to be added to the Screen Lock screen from the user, the unlock application being included in the list of applications.

Additionally, the method may further include the steps of receiving a deletion input related to an unlock application icon that is to be deleted from multiple unlock application icons displayed on the Screen Lock screen from a user, and deleting the unlock application icon that is to be deleted from the Screen Lock screen in accordance with the deletion input.

A Manifest file corresponding to each of the selected at least one unlock application may include information indicating that an unlock application icon of the selected at least one unlock application is to be displayed on the Screen Lock screen.

The Manifest file may include information related to a function that is available, among multiple functions being provided by the selected at least one unlock application, in case the selected at least one unlock application is selected in a Screen Lock environment.

The Manifest file may include information related to a method for having the selected at least one unlock application control another device, in case the selected at least one unlock application is selected in a Screen Lock environment.

The step of displaying an unlock application icon respective to each of the select at least one unlock application on the Screen Lock screen may include a step of displaying the unlock application icon in an area of the Screen Lock screen excluding a PIN code entry area.

The step of displaying an unlock application icon respective to each of the select at least one unlock application on the Screen Lock screen may include the steps of, in case a number N of unlock applications that are selected by the user to be displayed on the Screen Lock screen is greater than a number M of unlock applications that can be displayed on the Screen Lock screen, selecting M number of unlock applications from the unlock applications selected by the user and that are to be displayed on the Screen Lock screen, and displaying unlock application icons corresponding to each of the selected M number of unlock applications.

Additionally, the method may further include the steps of receiving a selection of an unlock application icon corresponding to an unlock application displayed on the Screen Lock screen from a user, executing the unlock application corresponding to the selected unlock application, and reading a Manifest file respective to the unlock application corresponding to the selected unlock application icon.

The Manifest file may include information related to a function that is available, among multiple functions being provided by the selected unlock application, in case the selected unlock application is selected in a Screen Lock environment, and, herein, the step of executing the unlock application corresponding to the selected unlock application may include a step of not providing functions other than a function being designated as a function available to the Manifest file, among multiple function being provided by the selected unlock application.

The Manifest file may include first information related to a method for having the selected unlock application control another device, in case the selected unlock application is selected in a Screen Lock environment, and, herein, the step of executing the unlock application corresponding to the selected unlock application may include the step of controlling the other device in accordance with the first information, the first information being stored in the Manifest file, in case the unlock application controls the other device.

In another aspect of the present invention, as a method for invoking an application in a user equipment, the method for invoking an application may include the steps of comparing a number N of unlock applications that are to be displayed on a Screen Lock screen, the N number of unlock applications being selected by a user, and a number M of pattern entry dots for unlocking the Screen Lock screen, and, based upon the compared result, displaying an unlock application icon corresponding to at least one unlock application on the Screen Lock screen, instead of displaying at least some of the M number of pattern entry dots.

The step of displaying an unlock application icon corresponding to at least one unlock application on the Screen Lock screen, instead of displaying at least some of the M number of pattern entry dots may include the step of, when the number N of unlock applications that are to be displayed on a Screen Lock screen, the N number of unlock applications being selected by a user, is equal to the number M of pattern entry dots for unlocking the Screen Lock screen, displaying unlock application icons respective to all of the selected N number of unlock applications.

The step of displaying an unlock application icon corresponding to at least one unlock application on the Screen Lock screen, instead of displaying at least some of the M number of pattern entry dots, may include the steps of, when the number N of unlock applications that are to be displayed on a Screen Lock screen, the N number of unlock applications being selected by a user, is equal to or smaller than the number M of pattern entry dots for unlocking the Screen Lock screen, selecting N number of pattern entry dots from the M number of pattern entry dots, displaying unlock application icons respective to the N number of unlock applications on the Screen Lock screen, instead of the selected N number of pattern entry dots, and displaying pattern entry dots at locations of M-N number of non-selected pattern entry dots on the Screen Lock screen.

The step of displaying an unlock application icon corresponding to at least one unlock application on the Screen Lock screen, instead of displaying at least some of the M number of pattern entry dots, may include the steps of, when the number N of unlock applications that are to be displayed on a Screen Lock screen, the N number of unlock applications being selected by a user, is greater than the number M of pattern entry dots for unlocking the Screen Lock screen, selecting M number of unlock applications from N number of unlock applications, and displaying unlock application icons respective to the M number of unlock applications on the Screen Lock screen, instead of the M number of pattern entry dots.

The step of selecting M number of unlock applications from N number of unlock applications may include the step of selecting the M number of unlock applications based upon at least one of a registration date and usage frequency of the N number of unlock applications.

And, the method may include the steps of receiving a pattern input for unlocking the Screen Lock screen from the user, and, in case the pattern input passes through an unlock application icon displayed on the Screen Lock screen, the corresponding unlock application is displayed by replacing a pattern guide icon.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a flow chart showing process steps of a method for adding an unlock application to a pattern entry environment Screen Lock screen according to an exemplary embodiment of the present invention; and FIG. 6 illustrates a flow chart showing process steps of a method for executing an unlock application by using an external interface according to an exemplary embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
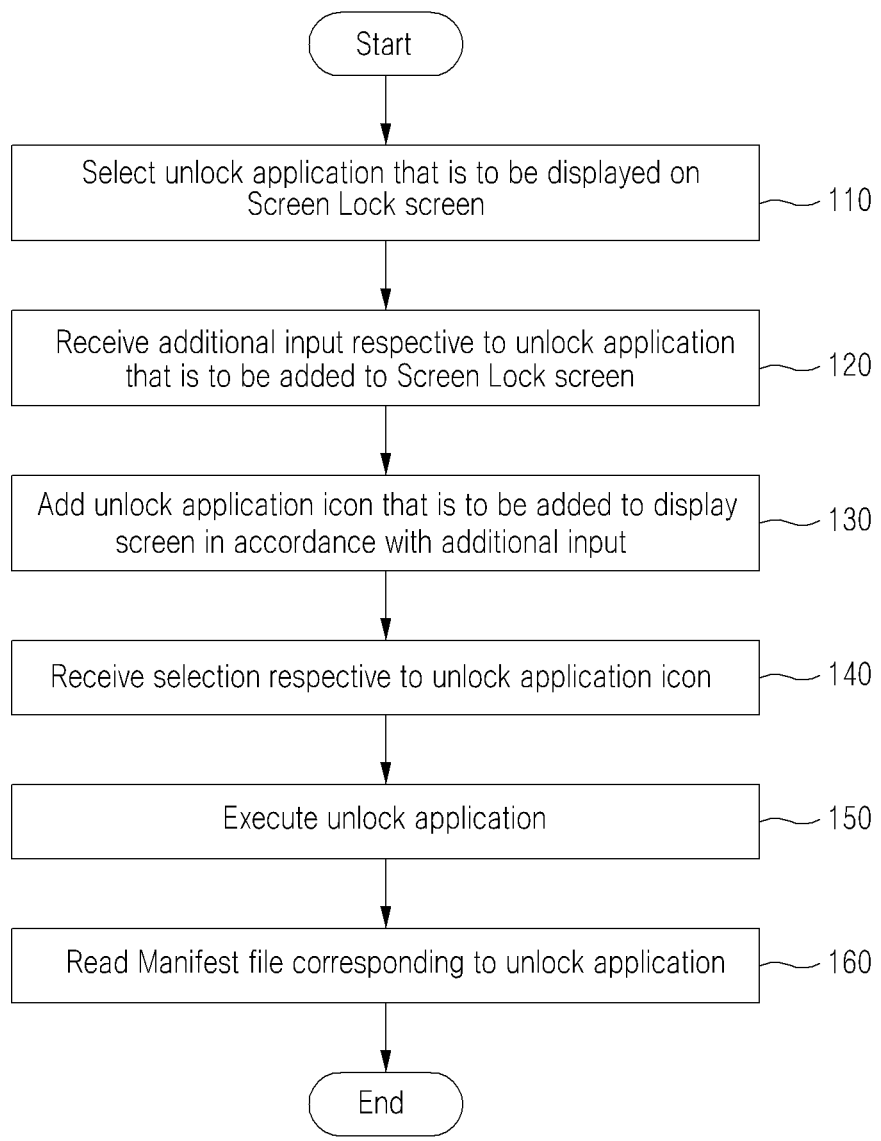
FIG. 1 illustrates an overall flowchart showing process steps of a method for running (or executing) an unlock application from a Screen Lock screen.

FIG. 1 illustrates an overall flowchart showing process steps of a method for running (or executing) an unlock application from a Screen Lock screen.

The method for executing an unlock application from a Screen Lock screen may include a step of selecting an unlock application that is to be displayed on the Screen Lock screen (110), a step of receiving additional input respective to the unlock application that is to be added to the Screen Lock screen (120), a step of adding an unlock application icon that is to be added to a display screen in accordance with the additional input (130), a step of receiving a selection respective to the unlock application icon (140), a step of executing the unlock application (150), and a step of reading a Manifest file corresponding to the unlock application (160).

In step (110), among multiple applications, at least one unlock application that is to be displayed on the Screen Lock screen may be selected by a program of a user equipment. Among the multiple applications installed in the user equipment, only applications that have been developed by complying with a predetermined standard may be displayed on the Screen Lock screen. For example, only applications using Device Discovery for a Local Interface, which is provided from a Mobile Platform, may be displayed on the Screen Lock screen. Additionally, an application that is to be displayed on the Screen Lock screen must describe Screen Lock information on a Manifest file. In case of an application that has been developed by using the above-described function may describe related information within an Application Manifest file.

Each of the at least one of the selected unlock applications may include a respective Manifest file. The Manifest file respective to each of the at least one of the selected unlock applications may include information indicating that an unlock application icon will be displayed on the Screen Lock screen. Additionally, among the multiple functions provided by the at least one of the selected unlock application, a function of providing information related to an available function when the at least one of the selected unlock applications is selected in a Screen Lock environment. Furthermore, in case the at least one of the selected unlock applications is selected in the Screen Lock environment, the at least one of the selected unlock applications may include information on a method for controlling another device.

In step (120), the user equipment may receive additional input respective to an unlock application icon, which is to be added to the Screen Lock screen. According to the exemplary embodiment, in order to receive the additional input respective to the unlock application icon, which is to be added to the Screen Lock screen, a list of applications installed in the user equipment may be provided to the user. For example, a list of all applications installed in the user equipment may be provided to the user, or, among the multiple applications installed in the user equipment, only a list of applications, which have been developed by complying with a predetermined standard in order to be displayed on the Screen Lock screen, may be provided to the user.

Accordingly, among the provided list of applications, an input respective to an unlock application, which is to be added to the Screen Lock screen, may be received from the user. For example, among the provided list of applications, the user may select only an unlock application that he (or she) wishes to add to the Screen Lock screen and may register the selected unlock application.

In step (130), the additional unlock application icon that is to be added may be added to the Screen Lock screen in accordance with the received additional input. According to the exemplary embodiment, when adding the unlock application icon to the Screen Lock screen, an unlock application icon respective to the at least one of the selected unlock application may be displayed on the Screen Lock screen. A method for displaying an unlock application icon on the Screen Lock screen may include a PIN code entry environment and a pattern entry environment. Additionally, among the unlock application icons that are displayed on the Screen Lock screen, a deletion input respective to an unlock application icon that is to be deleted may be received from the user. Thereafter, the unlock application icon that is to be deleted may be deleted from the Screen Lock screen in accordance with the deletion input.

In step (140), a selection of an unlock application icon may be received in order to display the unlock application icon on the Screen Lock screen. According to the exemplary embodiment, in a PIN code entry environment, the unlock application may be displayed on an area excluding a PIN code entry area. For example, the unlock application may be displayed above or below the PIN code entry area. Additionally, when a number N of unlock applications, which are to be displayed on the Screen Lock screen, is greater than a number M of unlock applications, which can be displayed on the Screen Lock screen, among the unlock applications that are selected by the user to be displayed on the Screen Lock screen, M number of unlock applications may be selected. Thereafter, unlock application icons corresponding to the M number of selected unlock applications may be displayed on the Screen Lock screen. For example, when the unlock applications that are to be displayed on the Screen Lock screen cannot all be displayed on the area excluding the PIN code entry area, the non-displayed unlock applications may be indicated by using a See More icon. A detailed description of the same will be provided later on with reference to FIG. 3.

According to another exemplary embodiment, in the pattern entry environment, unlock application icons respective to the unlock applications, which are to be displayed on the Screen Lock screen by the user, may be respectively displayed on a dot for pattern entry (or pattern entry dot). At this point, a number N of unlock applications, which are selected by the user, and which are to be displayed on the Screen Lock screen, may be compared with a number M of pattern entry dots for unlocking the Screen Lock screen. Thereafter, based upon the comparison result, among the M number of pattern entry dots, instead of at least some of the unlock applications, unlock application icons respective to at least one of the unlock applications may be displayed on the unlock application icon.

According to the exemplary embodiment, when the number N of unlock applications, which are selected by the user, and which are to be displayed on the Screen Lock screen, is equal to the number M of pattern entry dots for unlocking the Screen Lock screen, unlock application icons respective to all of the N number of selected unlock applications may be displayed on the Screen Lock screen.

Additionally, when the number N of unlock applications, which are selected by the user, and which are to be displayed on the Screen Lock screen, is smaller than or equal to the number M of pattern entry dots for unlocking the Screen Lock screen, among the M number of pattern entry dots, N number of pattern entry dots may be selected. Instead of the selected N number of pattern entry dots, unlock application icons respective to the N number of unlock applications may be displayed on the Screen Lock screen. Icons for a pattern guide may be displayed on the Screen Lock screen for the M-N number of pattern entry dots, which have not been selected.

Moreover, when the number N of unlock applications, which are selected by the user, and which are to be displayed on the Screen Lock screen, is greater than the number M of pattern entry dots for unlocking the Screen Lock screen, among the N number of unlock applications, M number of unlock applications may be selected. At this point, the M number of unlock applications may be selected based upon at least one of a registration date and a usage frequency of the N number of unlock applications. Thereafter, instead of the M number of pattern entry dots, unlock application icons respective to the M number of unlock applications may be displayed on the Screen Lock screen.

In order to unlock such Screen Lock screen, a pattern input may be received. At this point, in case the pattern input passes through an unlock application displayed on the Screen Lock screen, the corresponding unlock application (or the touched unlock application) may be displayed by replacing the icon for pattern guide.

In step (150), the unlock applications that are displayed on the Screen Lock screen may be executed (or run). When the user executes (or runs) an unlock application, which he (or she) intends to execute, the application may be executed after passing through a Manifest File reading limit.

In step (160), in order to execute the unlock application, a manifest file respective to the corresponding unlock application may be read. Among multiple functions provided by the selected unlock application, the manifest file may include information on a function that is available in case the selected unlock application has been selected from a Screen Lock environment. Additionally, among the multiple functions provided by the selected unlock application, functions other than a function that is designated as the function available to the Manifest file may not be provided. Moreover, in case the selected unlock application has been selected from the Screen Lock environment, the selected unlock application may include first information related to a method for controlling another device. And, in case the unlock application controls another device, the other device may be controlled in accordance with the first information, which is stored in the Manifest file. Reference may be made to Table 1 for detailed description of the Manifest file and the first information stored in the Manifest file.

Figure 2:
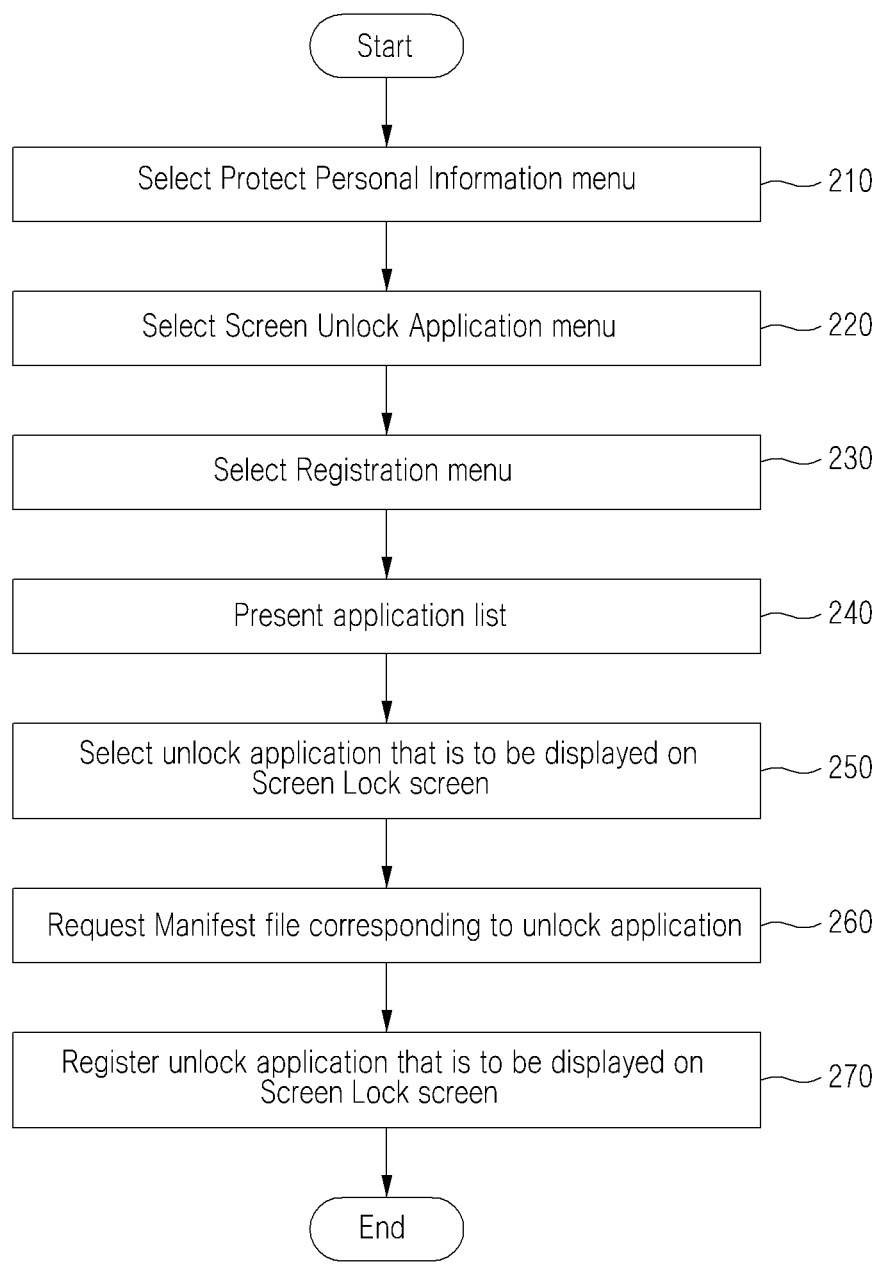
FIG. 2 illustrates a registration flow chart showing process steps for registering an unlock application according to an exemplary embodiment of the present invention.

FIG. 2 illustrates a registration flow chart showing process steps for registering an unlock application according to an exemplary embodiment of the present invention.

The method for registering an unlock application may include a step of selecting a Protect Personal Information menu (210), selecting a Screen Unlock Application menu (220), selecting a Registration menu (230), presenting an application list (240), selecting an unlock application that is to be displayed on the Screen Lock screen (250), requesting a Manifest file corresponding to the unlock application (260), and registering the unlock application that is to be displayed on the Screen Lock screen (270).

According to an exemplary embodiment, in step (210), the user may select a Protect Personal Information menu from an Environment Setup menu of the user equipment. Since an unlock application is used from the Screen Lock screen without any separate user authentication procedure, the unlock application may undergo a registration process before being displayed on the Screen Lock screen.

And, in step (220), a Screen Unlock Application menu may be selected from the Protect Personal Information menu. Thereafter, in step (230), after selecting a Registration menu, a list of applications installed in the user equipment may be invoked.

In step (240), an application list for displaying unlock applications on the Screen Lock screen may be presented. At this point, the presented application list may provide a list of all applications installed in the user equipment, or the presented application list may provide only a list of multiple applications, which have been developed by complying with a predetermined standard in order to be displayed on the Screen Lock screen.

In step (250), the user may select an unlock application that is to be displayed on the Screen Lock screen. Among the multiple applications, at least one unlock application that is to be displayed on the Screen Lock screen may be selected. Among the multiple applications installed in the user equipment, only applications that have been developed by complying with a predetermined standard may be displayed on the Screen Lock screen. For example, only applications using Device Discovery for a Local Interface, which is provided from a Mobile Platform, may be displayed on the Screen Lock screen. Additionally, an application that is to be displayed on the Screen Lock screen must describe Screen Lock information on a Manifest file. In case of an application that has been developed by using the above-described function may describe related information within an Application Manifest file.

In step (260), a Manifest file corresponding to the unlock application may be requested. Each selected unlock application may include a respective Manifest file. The Manifest file corresponding to each of the selected unlock applications may include information indicating that an icon respective to the corresponding unlock application is displayed on the Screen Lock screen. Additionally, among multiple functions provided by the selected unlock application, the manifest file may include information on a function that is available in case the selected unlock application has been selected from a Screen Lock environment. Moreover, in case the selected unlock application has been selected from the Screen Lock environment, the selected unlock application may include first information related to a method for controlling another device.

Table 1 shows information included in a Manifest file.

TABLE 1

| tag | Tag description | Value | Value description |
| --- | --- | --- | --- |
| screenlock:display | Whether or not service is supported in ScreenLock environment | true<br>false | Supported<br>Not supported |
| screenlock:controlfunction | Expresses range of functions available in ScreenLock environment | Local_control | Among application functions, description on function indicating only prefix "local_control" is only provided |
| | | All | Open all functions |
| screenlock:controlpoint | Describes controlling method of application for controlling another device (user interface information) | LocalDiscovery | LocalDiscovery supported only in Platform |
| | | UPnP | When UPnP-based Local Discovery function is used |
| | | unKnown | When a specific protocol is used between a user App. and a user equipment, registration is performed only after inquiring the user for authorization |

Among multiple tags in the Manifest file, screenlock:display may indicate whether or not a service is supported within the Screen Lock environment. In case the corresponding value is true, the service may be available for support in the Screen Lock environment, and, in case the corresponding value is false, the service may be available for support in the Screen Lock environment. In other words, screenlock:display may indicate whether or not the unlock application can be displayed in the Screen Lock environment.

Among multiple tags in the Manifest file, screenlock:controlfunction may indicate an expression of a range of functions available in the Screen Lock environment. In case the value corresponds to local_control (Local control), among the multiple application functions, a function indicating only the prefix 'local control' may be provided. Additionally, in case the value corresponds to all, all of the application functions may be used.

Another device may be controlled in accordance with first information stored in the Manifest file. The first information stored in the Manifest file may include screenlock:controlpoint, among the tags included in the Manifest file. The screenlock:controlpoint tag may describe a controlling method for having the application control another device. For example, the screenlock:controlpoint tag may include user interface information. When the value corresponds to Local Discovery, Local Discovery that is supported in the Platform may be used. Also, in case the value corresponds to UPnP, UPnP based Local Discovery may be used, and, in case the value corresponds to unKnown, as a case when a specific protocol is being used between the user application and the user equipment, the application may be register only after inquiring the user for authorization. In other words, in case of using a specific protocol between the user application and the user equipment, instead of using the Local Discovery that is supported in the Platform or the UPnP based Local Discovery, the application may be registered only after inquiring the user for authorization.

An example of the Manifest file is shown below.

---
Application Manifest Example
---
<application>
  <security>
    <screenlock:display>true</screenlock:display>
<screenlock:controlfunction>local_control</ screenlock:controlfunction >
    <screenlock:controlpoint>UPnP</screenlock>
  </security>
</application>

---

Referring to the exemplary Manifest of the application, a service in the Screen Lock environment may be available for support, and, among the application functions, only a function indicating a prefix 'local control' may be provided. Additionally, a UPnP based Local Discovery may be used. For example, by executing an application and performing the function of a remote controller, the application may be capable of controlling an external device.

In step (270), registration of the unlock application that is to be displayed on the Screen Lock screen may be performed. At this point, after reading the requested Manifest file, in case it is determined that the selected unlock application can be registered to the Screen Lock screen, the registration process of the unlock application may be performed.

Figure 3A:
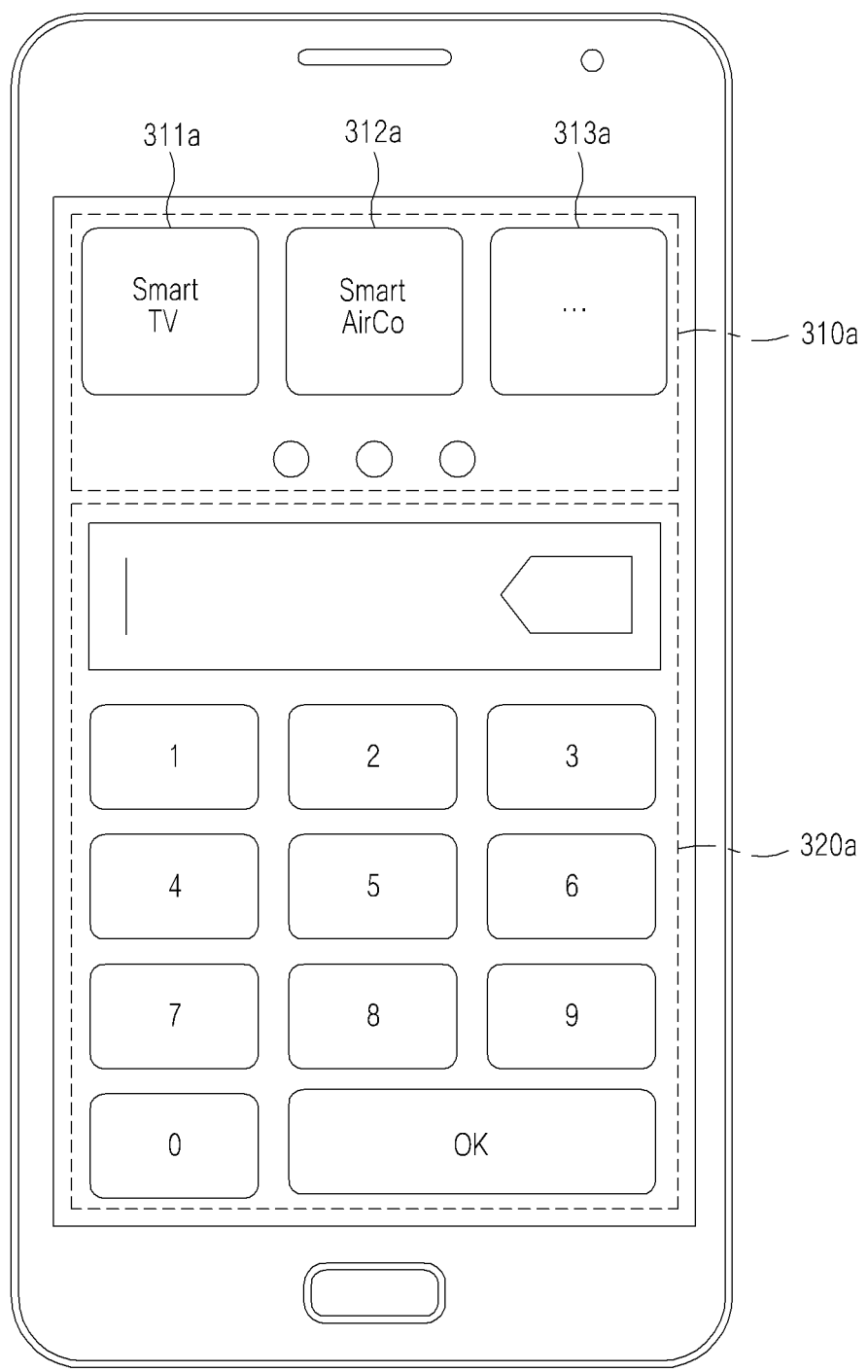
FIGS. 3a and 3b illustrate a method for adding an unlock application to a PIN entry environment Screen Lock screen according to an exemplary embodiment of the present invention.
Figure 3B:
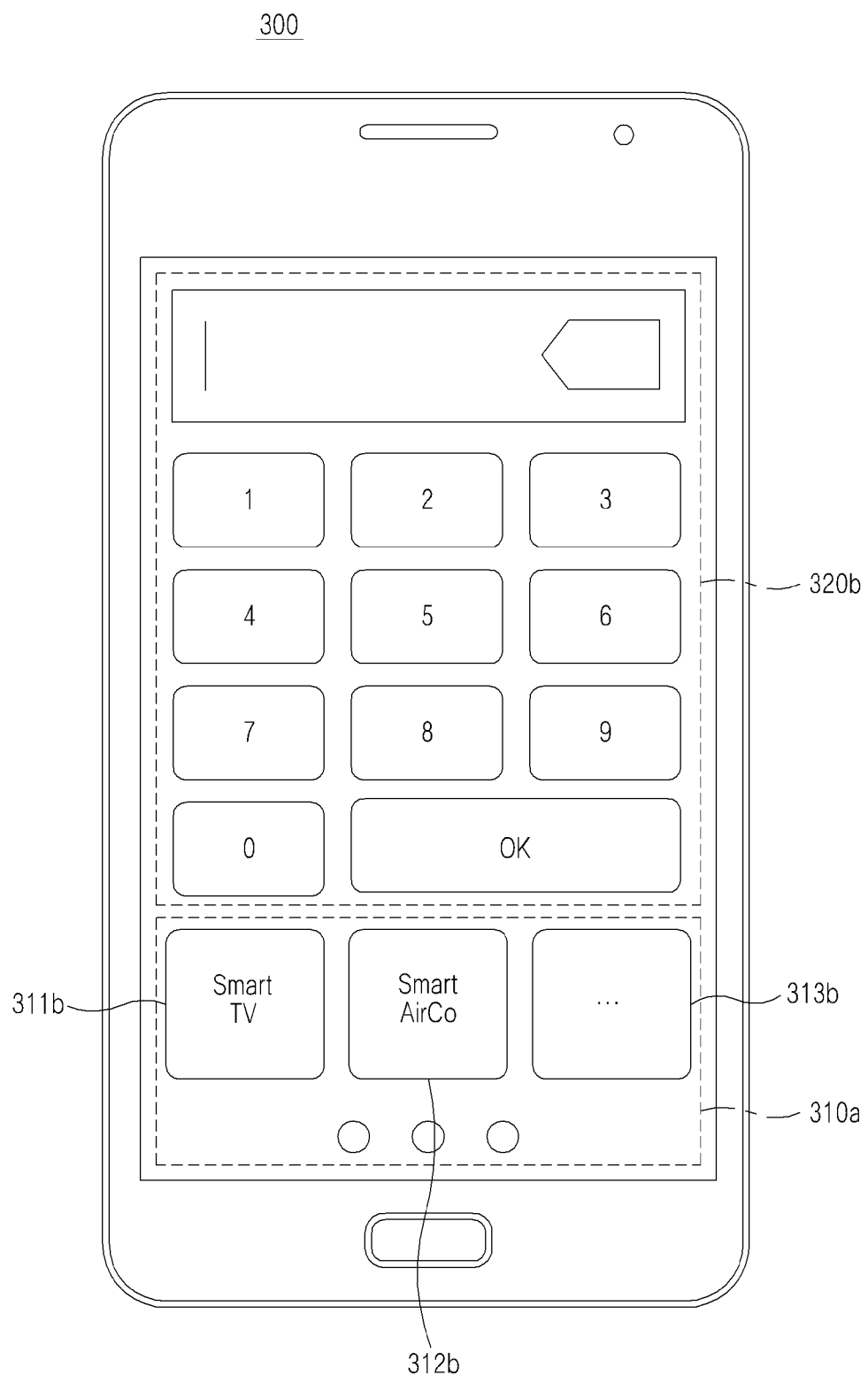

FIGS. 3a and 3b illustrate a method for adding an unlock application to a PIN entry environment Screen Lock screen according to an exemplary embodiment of the present invention. In the PIN entry environment, an unlock application may be displayed in an area excluding the PIN code entry area. For example, the unlock application may be displayed above or below the PIN code entry area.

Referring to FIG. 3a, a PIN entry environment Screen Lock screen 300 may include an unlock application display area 310a and a PIN code entry area 320a. The unlock application display area 310a located above the PIN code entry area may display unlock application icons 311a and 312a, which the user wishes to display on the Screen Lock screen. Additionally, in case the N number of unlock applications that are to be displayed on the Screen Lock screen is greater than an M number of unlock applications that can be displayed on the Screen Lock screen, among the unlock applications, which may be displayed on the Screen Lock screen, and which are selected by the user, M number of unlock applications may be selected. Thereafter, unlock application icons respective to the selected M number of unlock applications may be displayed on the Screen Lock screen. For example, when the unlock applications that are to be displayed on the Screen Lock screen cannot all be displayed on the area excluding the PIN code entry area, the non-displayed unlock applications may be indicated by using a See More icon 310a.

Referring to FIG. 3b, as described above in FIG. 3a, the PIN entry environment Screen Lock screen 300 may include an unlock application display area 310b and a PIN code entry area 320b. The unlock application display area 310b located below the PIN code entry area may display unlock application icons 311b and 312b, which the user wishes to display on the Screen Lock screen. For example, when the unlock applications that are to be displayed on the Screen Lock screen cannot all be displayed on the area excluding the PIN code entry area, the non-displayed unlock applications may be indicated by using a See More icon 310b.

Figure 4A:
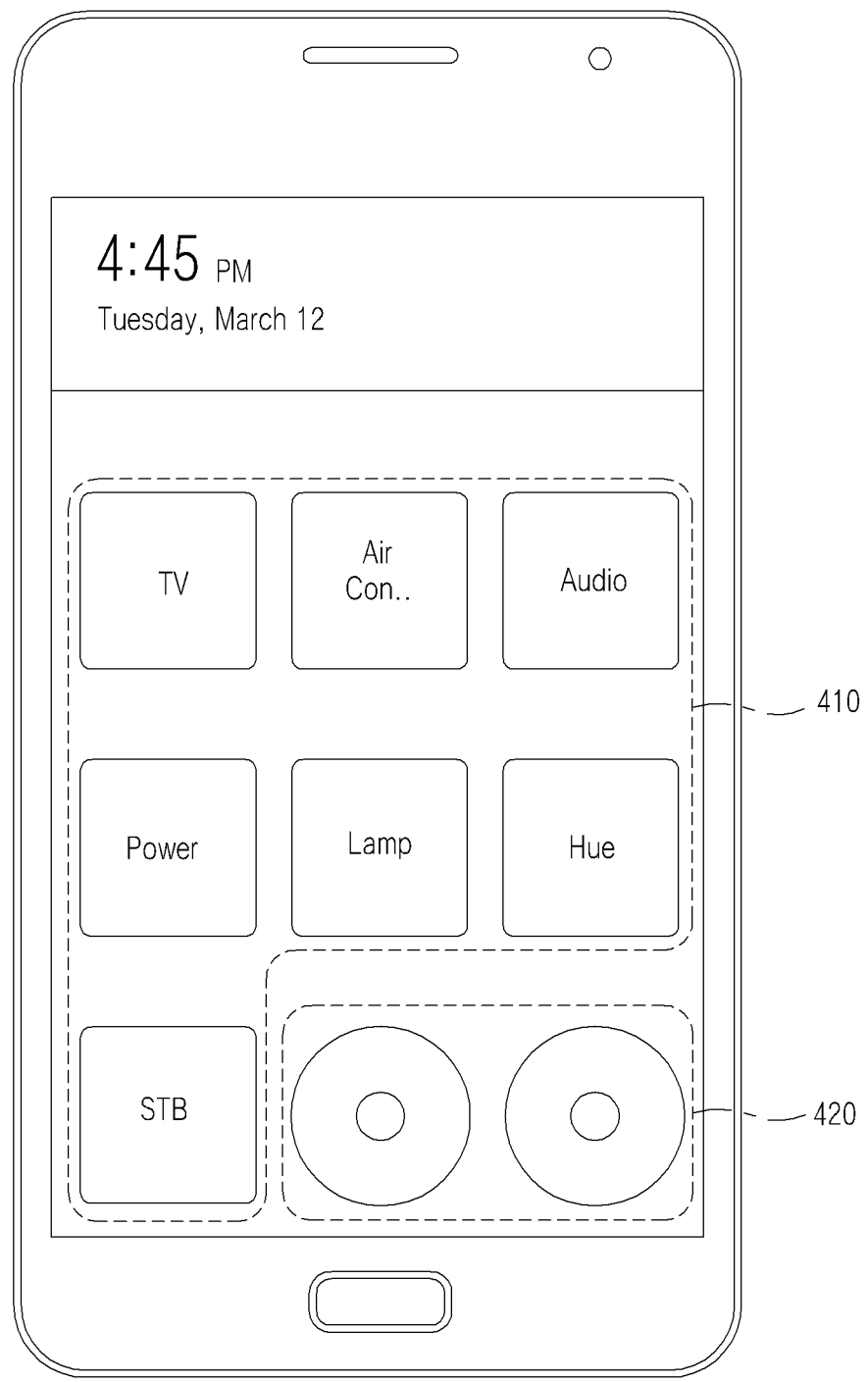
FIGS. 4a, 4b and 4c illustrate a method for adding an unlock application to a pattern entry environment Screen Lock screen according to an exemplary embodiment of the present invention.
Figure 4B:
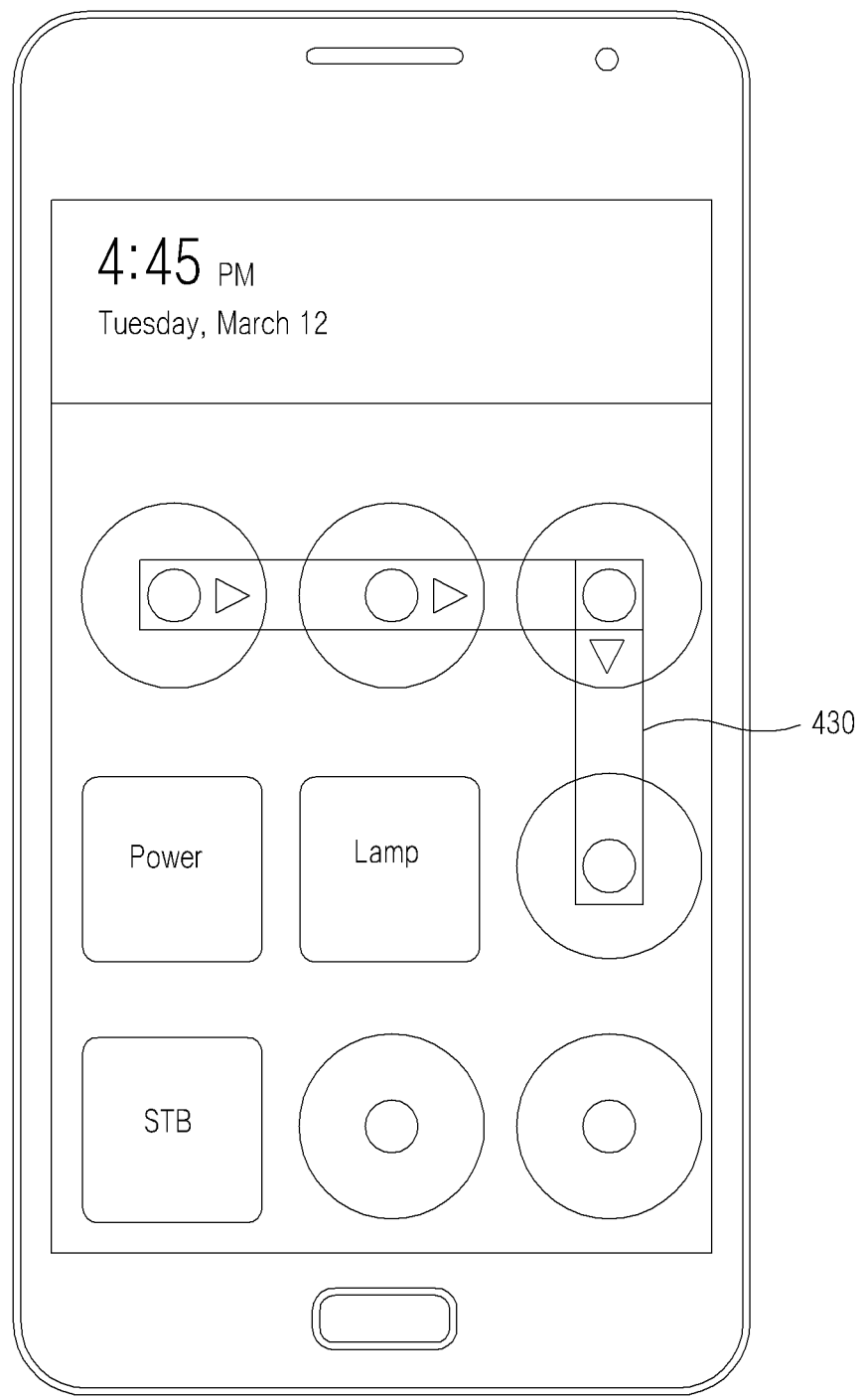
Figure 4C:
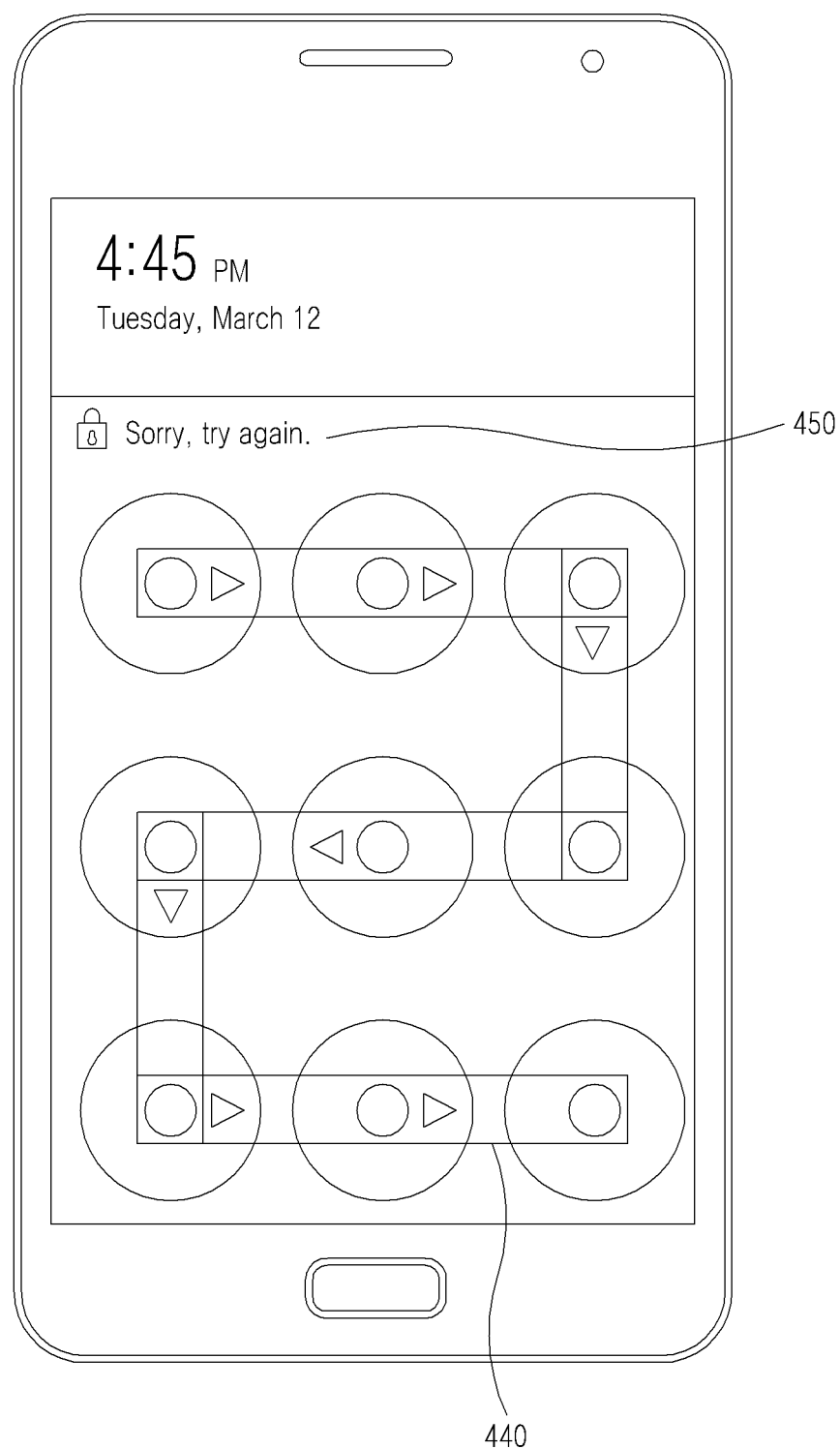

FIGS. 4a, 4b and 4c illustrate a method for adding an unlock application to a pattern entry environment Screen Lock screen according to an exemplary embodiment of the present invention.

Referring to FIG. 4a, unlock application icons 410, which the user wishes to display on the Screen Lock screen, may be displayed on a position of a pattern entry dot within the pattern entry environment Screen Lock screen. When all of the unlock application icons that are intended to be displayed on the pattern entry dots are displayed, a pattern guide icon 420 may be displayed on the remaining pattern entry dots.

Referring to FIG. 4b, a pattern 430 for unlocking the Screen Lock screen may be inputted from the Screen Lock screen. At this point, in case the pattern input passes through an unlock application displayed on the Screen Lock screen, the corresponding unlock application (or the touched unlock application) may be displayed by replacing the icon for pattern guide (or pattern guide icon).

Referring to FIG. 4c, when an incorrect pattern 440 is inputted in the Screen Lock screen, a notification message 450 may be displayed on the Screen Lock screen. For example, when an incorrect pattern 440 is inputted, an application icon through which the pattern input passes may be replaced by a pattern guide icon. However, in this case, a notification message saying 'Sorry, try again' may be indicated. Thereafter, unlock application icons 410 and a pattern guide icon 420 may be displayed once again, and a new pattern input may be received. A method for adding an unlock application to the pattern input environment Screen Lock screen will hereinafter be described in detail with reference to FIG. 5.

FIG. 5 illustrates a flow chart showing process steps of a method for adding an unlock application to a pattern entry environment Screen Lock screen according to an exemplary embodiment of the present invention. In the pattern entry environment, an unlock application icon respective to an unlock application, which the user intends to display on the Screen Lock screen, may be displayed on a pattern entry dot.

The method for adding an unlock application to a pattern entry environment Screen Lock screen may include a step of comparing a number N of unlock applications and a number M of dots for inputting an unlock pattern (510), a step of displaying unlock application icons on the Screen Lock screen (520), a step of loading the N number of unlock application icons, in case the number N of unlock applications is smaller than the M number of pattern entry dots (530), and a step of selecting and loading M of N number of unlock application icons, in case the number N of unlock applications is greater than the M number of pattern entry dots (540).

In step (510), a number N of unlock applications, which are selected by the user, and which are to be displayed on the Screen Lock screen, may be compared with a number M of pattern entry dots for unlocking the Screen Lock screen. Thereafter, based upon the comparison result, among the M number of pattern entry dots, instead of at least some of the unlock applications, unlock application icons respective to at least one of the unlock applications may be displayed on the unlock application icon.

In step (520), unlock application icons may be displayed on the Screen Lock screen. According to the exemplary embodiment, when the number N of unlock applications, which are selected by the user, and which are to be displayed on the Screen Lock screen, is equal to the number M of pattern entry dots for unlocking the Screen Lock screen, unlock application icons respective to all of the N number of selected unlock applications may be displayed on the Screen Lock screen.

In step (530), when the number N of unlock applications, which are selected by the user, and which are to be displayed on the Screen Lock screen, is smaller than or equal to the number M of pattern entry dots for unlocking the Screen Lock screen, among the M number of pattern entry dots, N number of pattern entry dots may be selected. Instead of the selected N number of pattern entry dots, unlock application icons respective to the N number of unlock applications may be displayed on the Screen Lock screen. Icons for a pattern guide may be displayed on the Screen Lock screen for the M-N number of pattern entry dots, which have not been selected.

In step (540), when the number N of unlock applications, which are selected by the user, and which are to be displayed on the Screen Lock screen, is greater than the number M of pattern entry dots for unlocking the Screen Lock screen, among the N number of unlock applications, M number of unlock applications may be selected. At this point, the M number of unlock applications may be selected based upon at least one of a registration date and a usage frequency of the N number of unlock applications. Thereafter, instead of the M number of pattern entry dots, unlock application icons respective to the M number of unlock applications may be displayed on the Screen Lock screen.

In order to unlock such Screen Lock screen from the Screen Lock screen, which is displayed by using the above-described method, a pattern input may be received. At this point, in case the pattern input passes through an unlock application displayed on the Screen Lock screen, the corresponding unlock application (or the touched unlock application) may be displayed by replacing the icon for pattern guide.

FIG. 6 illustrates a flow chart showing process steps of a method for executing an unlock application by using an external interface according to an exemplary embodiment of the present invention.

When an application is executed in the Screen Lock screen, in addition to the application manifest based information verification process during the registration procedure, restrictions may be configured so that the application cannot be capable of additionally using internal information of the user equipment and an external interface accessing function.

The method for executing an unlock application by using an external interface may include a step of invoking an application (610), a step of verifying whether or not a point of the application invocation corresponds to the Screen Lock screen (620), a step of loading manifest information corresponding to the application (630), a step of executing the application (640), a step of requesting an external interface (650), a step of verifying the presence or absence of an interface described in the manifest (660), a step of connecting the interface (670), and a step of blocking a function (680).

In step (610), the user may invoke an application he (or she) wishes to execute. At this point, within the Screen Lock screen, or after unlocking the Screen Lock screen, the application may correspond to an application, which is invoked from an application list, which is configured as a collection of cards.

In step (620), the user may verify whether the invocation point of the invoked application corresponding to the Screen Lock screen. In other words, the user may verify whether the application, which the user intends to execute, has been invoked from the Screen Lock screen, or whether the application has been invoked from an application list configured as a collection of cards after unlocking the Screen Lock screen. Among the multiple applications installed in the user equipment, only applications that have been developed by complying with a predetermined standard may be displayed on the Screen Lock screen. For example, only applications using Device Discovery for a Local Interface, which is provided from a Mobile Platform, may be displayed on the Screen Lock screen. Additionally, an application that is to be displayed on the Screen Lock screen must describe Screen Lock information on a Manifest file. In case of an application that has been developed by using the above-described function may describe related information within an Application Manifest file. For example, among multiple tags in the Manifest file, screenlock:display may indicate whether or not a service is supported within the Screen Lock environment. In case the corresponding value is true, the service may be available for support in the Screen Lock environment, and, in case the corresponding value is false, the service may be available for support in the Screen Lock environment. In other words, screenlock:display may indicate whether or not the unlock application can be displayed in the Screen Lock environment.

Among multiple tags in the Manifest file, screenlock:controlfunction may indicate an expression of a range of functions available in the Screen Lock environment. In case the value corresponds to local_control (Local control), among the multiple application functions, a function indicating only the prefix 'local control' may be provided. Additionally, in case the value corresponds to all, all of the application functions may be used. In case the invocation point of the invoked application does not correspond to the Screen Lock screen, the process step may be skipped to the step of executing the application (640).

In case the invocation point of the invoked application corresponds to the Screen Lock screen, in step (630), Manifest information corresponding to the unlock application may be loaded. Each unlock application may include a respective Manifest file. The Manifest file corresponding to each of the unlock applications may include information indicating that an icon respective to the corresponding unlock application is displayed on the Screen Lock screen. Additionally, among multiple functions provided by the unlock application, the manifest file may include information on a function that is available in case the unlock application has been selected from a Screen Lock environment. Moreover, in case the unlock application has been selected from the Screen Lock environment, the unlock application may include first information related to a method for controlling another device.

In step (640), the invoked application may be executed. The unlock application, which is displayed on the Screen Lock screen, may be executed. When the user executes (or runs) an unlock application, which he (or she) intends to execute, the application may be executed after passing through a Manifest File reading limit.

According to the exemplary embodiment, in case of executing an unlock application using an external interface, in step (650), a request for an external interface, which is intended to be used in order to control another device, may be performed. For example, when a remote controller function is performed by executing the unlock application, the request for an external interface, which is intended to be used in order to control another device, may be performed.

In step (660), among the interfaces described within the Manifest, the presence or absence of the external interface, which is intended to be used in order to control another device, may be verified. For example, another device may be controlled in accordance with first information stored in the Manifest file. The first information stored in the Manifest file may include screenlock:controlpoint, among the tags included in the Manifest file. The screenlock:controlpoint tag may describe a controlling method for having the application control another device. For example, the screenlock:controlpoint tag may include user interface information. When the value corresponds to Local Discovery, Local Discovery that is supported in the Platform may be used. Also, in case the value corresponds to UPnP, UPnP based Local Discovery may be used, and, in case the value corresponds to unKnown, as a case when a specific protocol is being used between the user application and the user equipment, the application may be register only after inquiring the user for authorization. In other words, in case of using a specific protocol between the user application and the user equipment, instead of using the Local Discovery that is supported in the Platform or the UPnP based Local Discovery, the application may be registered only after inquiring the user for authorization.

In step (670), among the interfaces described within the Manifest, when the external interface that is intended to be used exists, a connection attempt with the corresponding external interface may be made. By being connected to the external interface, another device may be controlled. For example, by performing the function of a remote controlled after executing the unlock application, another device may be controlled.

In step (608), among the interfaces described within the Manifest, when the external interface that is intended to be used does not exist, the function of the application may be blocked. After blocking the application function, the process step may move back to the step of loading Manifest information corresponding to an application (630).

As described above, the method for invoking applications in a Lock Screen environment according to the present invention has the following advantages. According to the exemplary embodiments of the present invention, in case a user uses an application for controlling devices within a mobile user equipment environment, the user may be capable of invoking a specific application more easily and conveniently.

For example, such applications may include device controlling applications, such as TV applications, air-conditioner applications, and so on, IR based control applications using Audio Out terminals of a mobile user equipment, and an N-Screen controlling application, which has been recently released. Additionally, issues related to security and remote device controlling, which may be problematic, have been resolved.

The above-described device according to the exemplary embodiment of the present invention may be realized in the form of a hardware component, a software component, and/or a combination of a hardware component and a software component. For example, the device and corresponding components according to the above-described exemplary embodiments of the present invention may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present invention, the present invention may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present invention may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present invention, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

It will be apparent to those skilled in the art that various modifications and variations can be made in the present invention without departing from the spirit or scope of the inventions. For example, the above-described techniques may be executed in an order different from that described in the description of the present invention, and/or the components of the above-described system, structure, equipment (or device), circuit, and so on, may be combined in a format different that of the above-described method according to the present invention, and an adequate result may be achieved even if the above-described components of the present invention are replaced by any other component or its equivalent.

Thus, it is intended that the present invention covers other realizations and other embodiments of this invention provided they come within the scope of the appended claims and their equivalents.

What is claimed is:

1. A method for invoking an application in a user equipment, the method for invoking an application comprises:
    selecting at least one unlock application that is to be displayed on a Screen Lock screen among multiple applications;
    comparing the number of unlock applications that are to be displayed on a Screen Lock screen, the number of unlock applications being selected by a user, and a number of pattern entry dots for unlocking the Screen Lock screen; and
    displaying, based on the comparison result, an unlock application icon respective to each of the select at least one unlock application on the Screen Lock screen.

2. The method of claim 1, further comprising:
    receiving an additional input related to an unlock application icon that is to be added to the Screen Lock screen from a user; and
    adding the unlock application icon that is to be added to the Screen Lock screen in accordance with the additional input.

3. The method of claim 2, wherein the receiving an additional input related to an unlock application icon that is to be added to the Screen Lock screen from a user comprises:
    providing a list of applications being installed in the user equipment to the user; and
    receiving an input related to an unlock application that is to be added to the Screen Lock screen from the user, the unlock application being included in the list of applications.

4. The method of claim 1, further comprising:
    receiving a deletion input related to an unlock application icon that is to be deleted from multiple unlock application icons displayed on the Screen Lock screen from a user; and
    deleting the unlock application icon that is to be deleted from the Screen Lock screen in accordance with the deletion input.

5. The method of claim 1, wherein a Manifest file corresponding to each of the selected at least one unlock application comprises information indicating that an unlock application icon of the selected at least one unlock application is to be displayed on the Screen Lock screen.

6. The method of claim 5, wherein the Manifest file comprises information related to a function that is available, among multiple functions being provided by the selected at least one unlock application, in case the selected at least one unlock application is selected in a Screen Lock environment.

7. The method of claim 5, wherein the Manifest file comprises information related to a method for having the selected at least one unlock application control another device, in case the selected at least one unlock application is selected in a Screen Lock environment.

8. The method of claim 1, wherein the displaying an unlock application icon respective to each of the select at least one unlock application on the Screen Lock screen comprises:
    displaying the unlock application icon in an area of the Screen Lock screen excluding a PIN code entry area.

9. The method of claim 1, wherein the displaying an unlock application icon respective to each of the select at least one unlock application on the Screen Lock screen comprises:
    in case a number N of unlock applications that are selected by the user to be displayed on the Screen Lock screen is greater than a number M of unlock applications that can be displayed on the Screen Lock screen, selecting M number of unlock applications from the unlock applications selected by the user and that are to be displayed on the Screen Lock screen; and
    displaying unlock application icons corresponding to each of the selected M number of unlock applications.

10. The method of claim 1, further comprising:
    receiving a selection of an unlock application icon corresponding to an unlock application displayed on the Screen Lock screen from a user; and
    executing the unlock application corresponding to the selected unlock application.

11. The method of claim 10, further comprising:
    reading a Manifest file respective to the unlock application corresponding to the selected unlock application icon.

12. The method of claim 11, wherein the Manifest file comprises information related to a function that is available, among multiple functions being provided by the selected unlock application, in case the selected unlock application is selected in a Screen Lock environment, and
    wherein the executing the unlock application corresponding to the selected unlock application comprises:
    not providing functions other than a function being designated as a function available to the Manifest file, among multiple function being provided by the selected unlock application.

13. The method of claim 11, wherein the Manifest file comprises first information related to a method for having the selected unlock application control another device, in case the selected unlock application is selected in a Screen Lock environment, and
    wherein the executing the unlock application corresponding to the selected unlock application comprises:
    controlling the other device in accordance with the first information, the first information being stored in the Manifest file, in case the unlock application controls the other device.

14. As a method for invoking an application in a user equipment, the method for invoking an application comprises:

comparing a number N of unlock applications that are to be displayed on a Screen Lock screen, the N number of unlock applications being selected by a user, and a number M of pattern entry dots for unlocking the Screen Lock screen; and based upon the compared result, displaying an unlock application icon corresponding to at least one unlock application on the Screen Lock screen, instead of displaying at least some of the M number of pattern entry dots.

15. The method of claim 14, wherein the displaying an unlock application icon corresponding to at least one unlock application on the Screen Lock screen, instead of displaying at least some of the M number of pattern entry dots, comprises:

when the number N of unlock applications that are to be displayed on a Screen Lock screen, the N number of unlock applications being selected by a user, is equal to the number M of pattern entry dots for unlocking the Screen Lock screen, displaying unlock application icons respective to all of the selected N number of unlock applications.

16. The method of claim 14, wherein the displaying an unlock application icon corresponding to at least one unlock application on the Screen Lock screen, instead of displaying at least some of the M number of pattern entry dots, comprises:

when the number N of unlock applications that are to be displayed on a Screen Lock screen, the N number of unlock applications being selected by a user, is equal to or smaller than the number M of pattern entry dots for unlocking the Screen Lock screen, selecting N number of pattern entry dots from the M number of pattern entry dots;

displaying unlock application icons respective to the N number of unlock applications on the Screen Lock screen, instead of the selected N number of pattern entry dots; and displaying pattern entry dots at locations of M-N number of non-selected pattern entry dots on the Screen Lock screen.

17. The method of claim 14, wherein the displaying an unlock application icon corresponding to at least one unlock application on the Screen Lock screen, instead of displaying at least some of the M number of pattern entry dots, comprises:

when the number N of unlock applications that are to be displayed on a Screen Lock screen, the N number of unlock applications being selected by a user, is greater than the number M of pattern entry dots for unlocking the Screen Lock screen, selecting M number of unlock applications from N number of unlock applications; and displaying unlock application icons respective to the M number of unlock applications on the Screen Lock screen, instead of the M number of pattern entry dots.

18. The method of claim 17, wherein the selecting M number of unlock applications from N number of unlock applications comprises:

selecting the M number of unlock applications based upon at least one of a registration date and usage frequency of the N number of unlock applications.

19. The method of claim 14, comprising:

receiving a pattern input for unlocking the Screen Lock screen from the user; and in case the pattern input passes through an unlock application icon displayed on the Screen Lock screen, the corresponding unlock application is displayed by replacing a pattern guide icon.

* * * * *